United States Patent [19]
Wodeslavsky

[11] Patent Number: 5,862,741
[45] Date of Patent: Jan. 26, 1999

[54] INDOOR AND OUTDOOR SMOKELESS GRILL

[76] Inventor: Josef Wodeslavsky, #5 Peter Lunas Ct., Tenafly, N.J. 07670

[21] Appl. No.: 911,714

[22] Filed: Aug. 15, 1997

[51] Int. Cl.⁶ .............................. A47J 37/04; A47J 37/06
[52] U.S. Cl. ................................ 99/340; 99/446; 99/450; 99/482; 126/9 R; 126/25 R
[58] Field of Search .............................. 99/339, 340, 352, 99/355, 444–450, 481, 482, 467, 483, 417; 126/25 R, 25 A, 9 R, 9 B, 41 R, 25 B

[56] References Cited

U.S. PATENT DOCUMENTS

| | | | |
|---|---|---|---|
| 3,299,800 | 1/1967 | Angelo | 99/417 |
| 4,094,295 | 6/1978 | Boswell et al. | 126/25 R |
| 4,495,860 | 1/1985 | Hitch et al. | 99/340 |
| 4,962,696 | 10/1990 | Gillis | 99/448 X |
| 4,962,697 | 10/1990 | Farrar | 99/482 X |

*Primary Examiner*—Timothy F. Simone

[57] ABSTRACT

An indoor and outdoor smokeless grill comprising a housing which contains at least two openings, one at the bottom and one at the top. The housing consists of a water tank, which is situated between the openings of the housing. The housing is situated on a heat source such as a stove, whereby the hot air that rises from the burner of the stove will bypass the tank and will cook the meat that is situated on a grill that is disposed on top of the housing. When fat from the meat melts, the fat will drip into the water tank, such that fat will not drip on the heat source, thus grilling the meat while avoiding the smoke that results from the burning of the fat.

12 Claims, 5 Drawing Sheets

INDOOR AND OUTDOOR SMOKELESS GRILL

FIELD OF THE INVENTION

The present invention relates generally to indoor grills for cooking food like red meat and chicken. But such a grill will not require a chimney or other kind of ventilation to drive the smoke out of the house, since this type of grill will not produce smoke.

The aim of this invention is to permit the user to enjoy the taste of meat that has been cooked on an open fire whereby the fire is in direct contact with the meat, but without suffering the drawback of smoke being created during the cooking process. This grill can be used in a closed kitchen on an ordinary stove.

Additional aims of this invention are to reduce the risk of burning the grilled food even if the user leaves it cooking for too long a period and to keep the grilled food more moist.

BACKGROUND OF THE INVENTION

The benefits of grills for cooking food have been known since the early days when people used fire to cook and grill. But no one has offered an open grill that can be used indoors without a chimney, since contact between meat and fire melts the fat in the meat and the contact between the fat and the fire will ignite the fat, which will burn and create smoke.

Many ideas have been proposed for indoor grills, such as frying with no oil on intermediate heat, or having the cooking flame positioned above the meat, but none have succeeded. My invention uses the concept that fire or very hot air will heat the meat from underneath and from the top, and that the very same air will ventilate the kitchen.

The other problem that this invention solves is that there is no direct contact between the fat and the fire or heat source, which eliminates the residue of fat or other liquids that might drip on the source of the fire. Like the stove burner, it will keep the stove clean of meat particles and fat.

It is known that if foods like red meat or chicken are left on a grill too long, they will burn or become dry. My invention addresses this problem and provides a solution to it.

FIG., 2 will illustrate the smokeless grill cooking on a stove.

Figure 3:
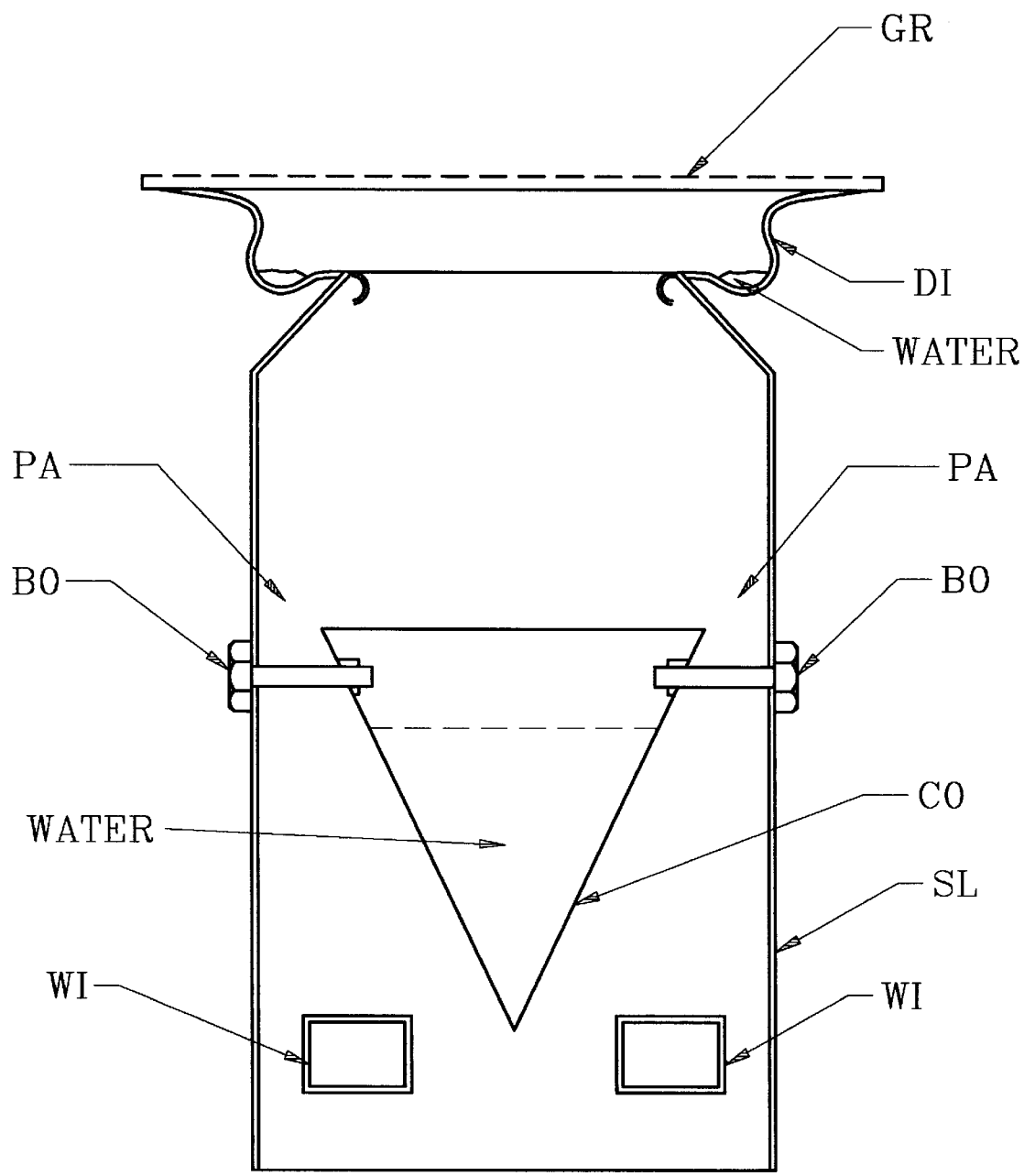

FIG. 3 will illustrate the smokeless grill with a second stage of fat trap.

Figure 4:
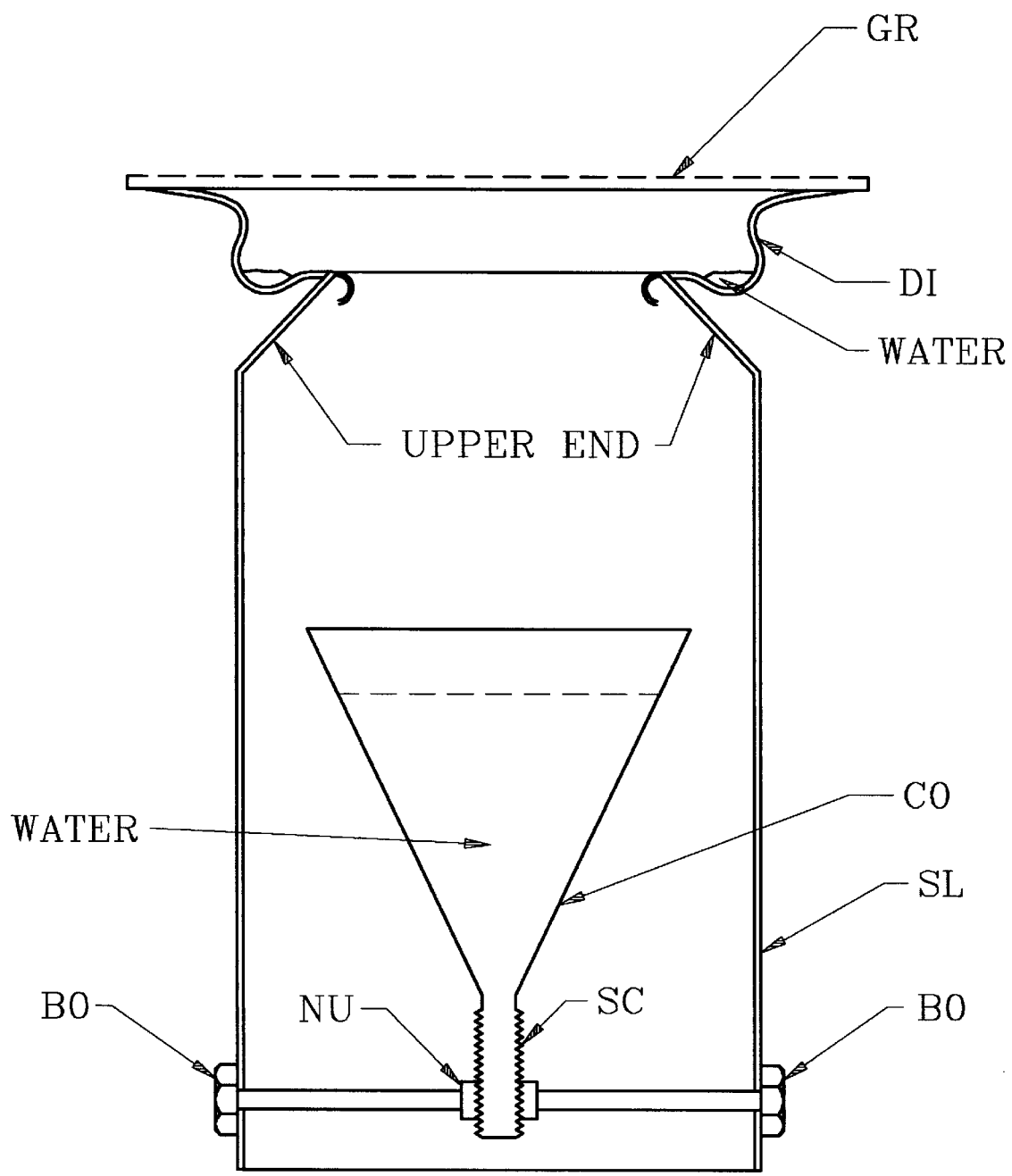

FIG. 4 will illustrate the manual heat control adjustment feature.

Figure 5:
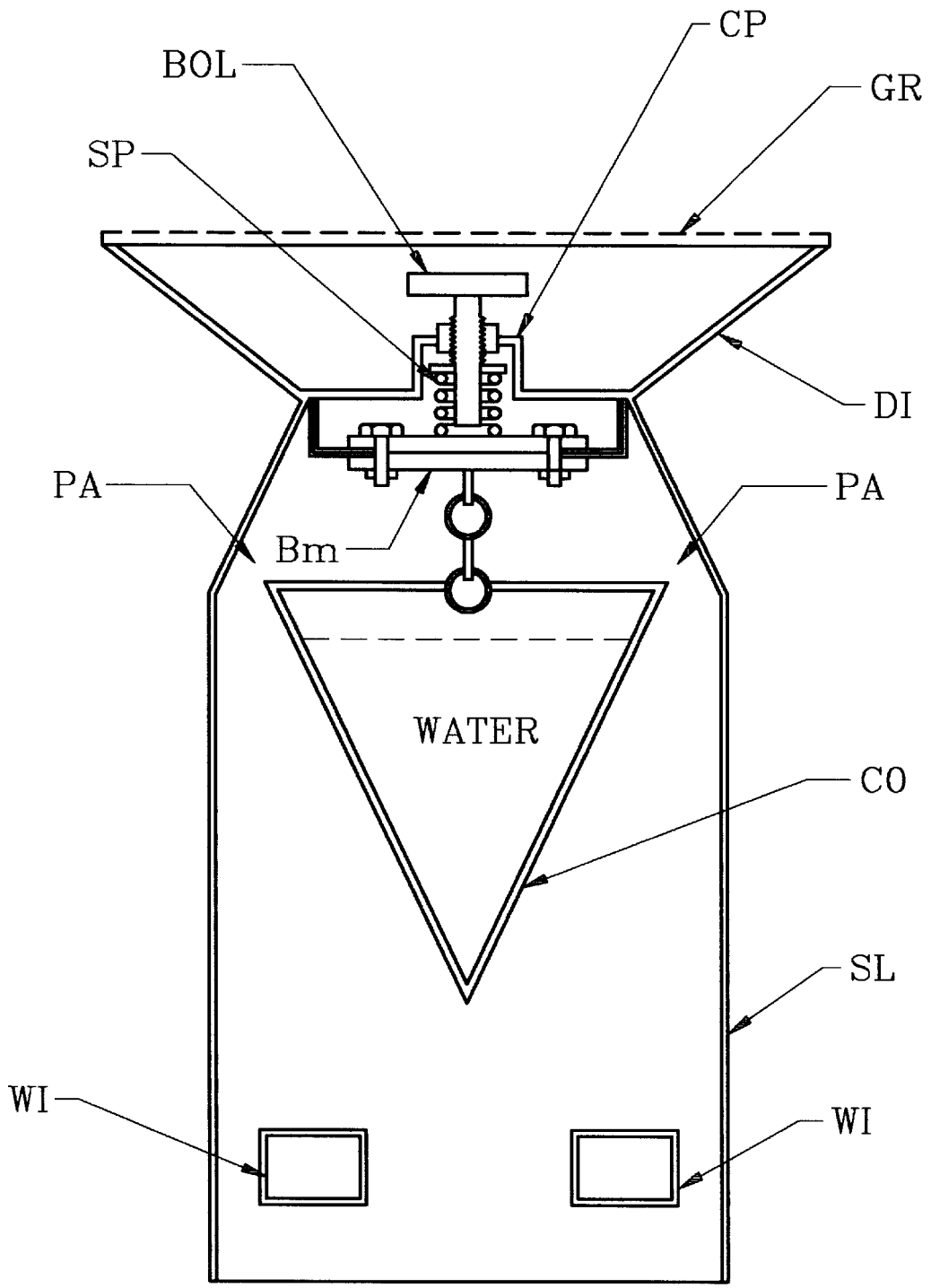

FIG. 5 will illustrate the automatic heat control adjustment feature.

DETAILED DESCRIPTION OF THE DRAWINGS

Figure 1:
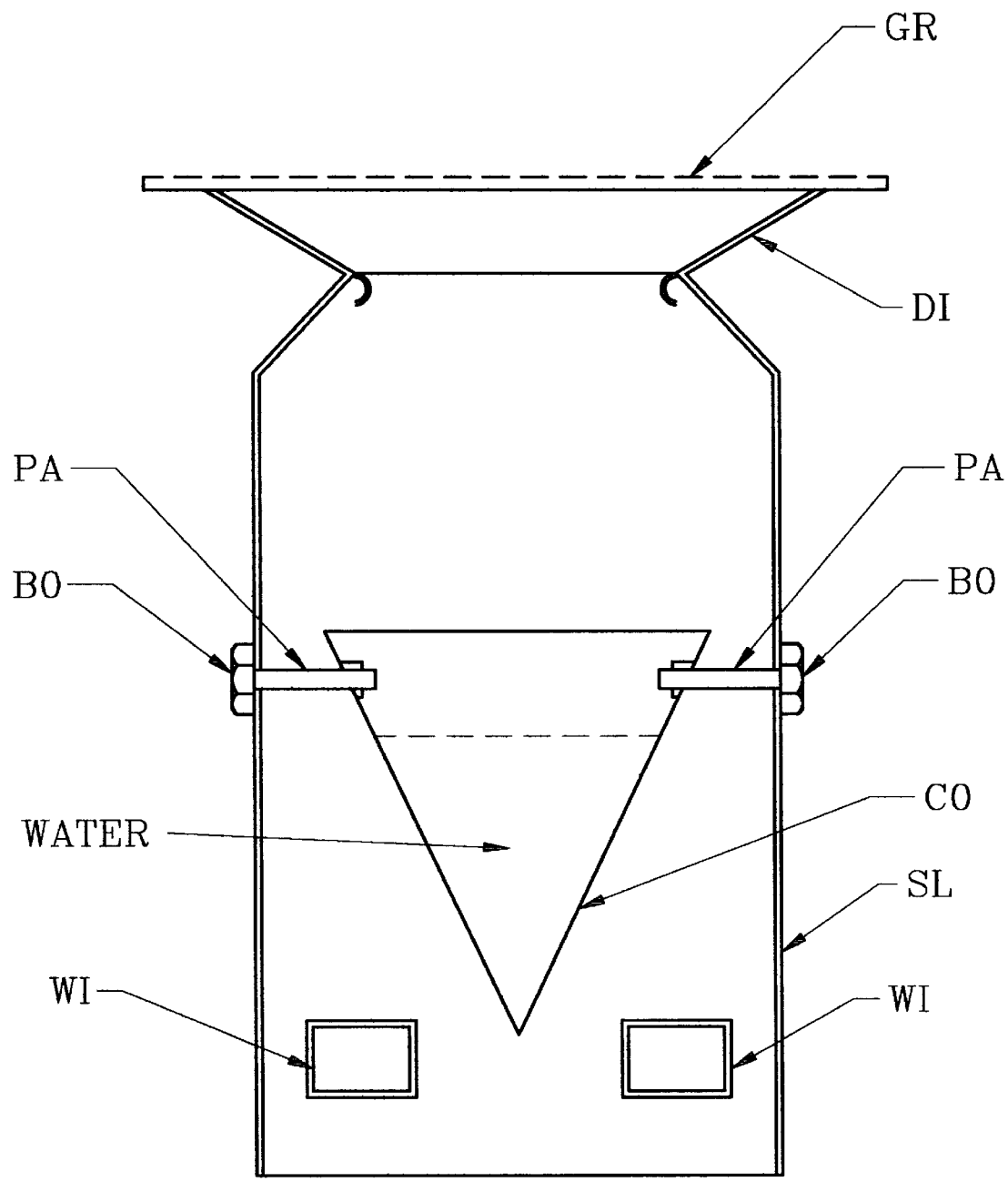
FIG. 1 will illustrate the indoor smokeless grill embodiment.

FIG. 1 will illustrate the indoor smokeless grill, which consists of an embodiment SL which can be constructed as a round sleeve. At the bottom it has windows W1. To the sleeve SL is attached container CO by bolts BO. On the upper part of the sleeve SL is mounted a round dish DI, and on the top of said dish sits a grill GR. Lips LP, extending into sleeve SL or from dish D1. The container CO could be cone-shaped, and should be filled with water during the cooking process. The upper diameter of container CO is larger than the upper diameter of sleeve SL. This difference in size will cause the melting fat to fall into the container because of the force of gravity, avoiding dripping on the burner. Fat dripping on dish DI will travel down the lips LP and will drip into container CO.

If said sleeve is situated on a stove, the lower part of the container CO will be distanced from the fire source and the hot burning air will pass between the inner part of the sleeve SL and the upper part of the water container CO. The difference between the diameters of these parts will establish an air passage PA. The hot air will climb until it faces the grill GR. The meat that will be situated on the grill will be heated and cooked and the temperature will rise until the fat starts melting and will fall into container CO which is filled with water, avoiding contact with the fire source. The burning air will boil the water in container CO, turning it into steam. This steam will reduce the temperature of the hot air cooking the meat, thereby preventing the meat from burning, even if it stays on the grill for a long time.

Figure 2:
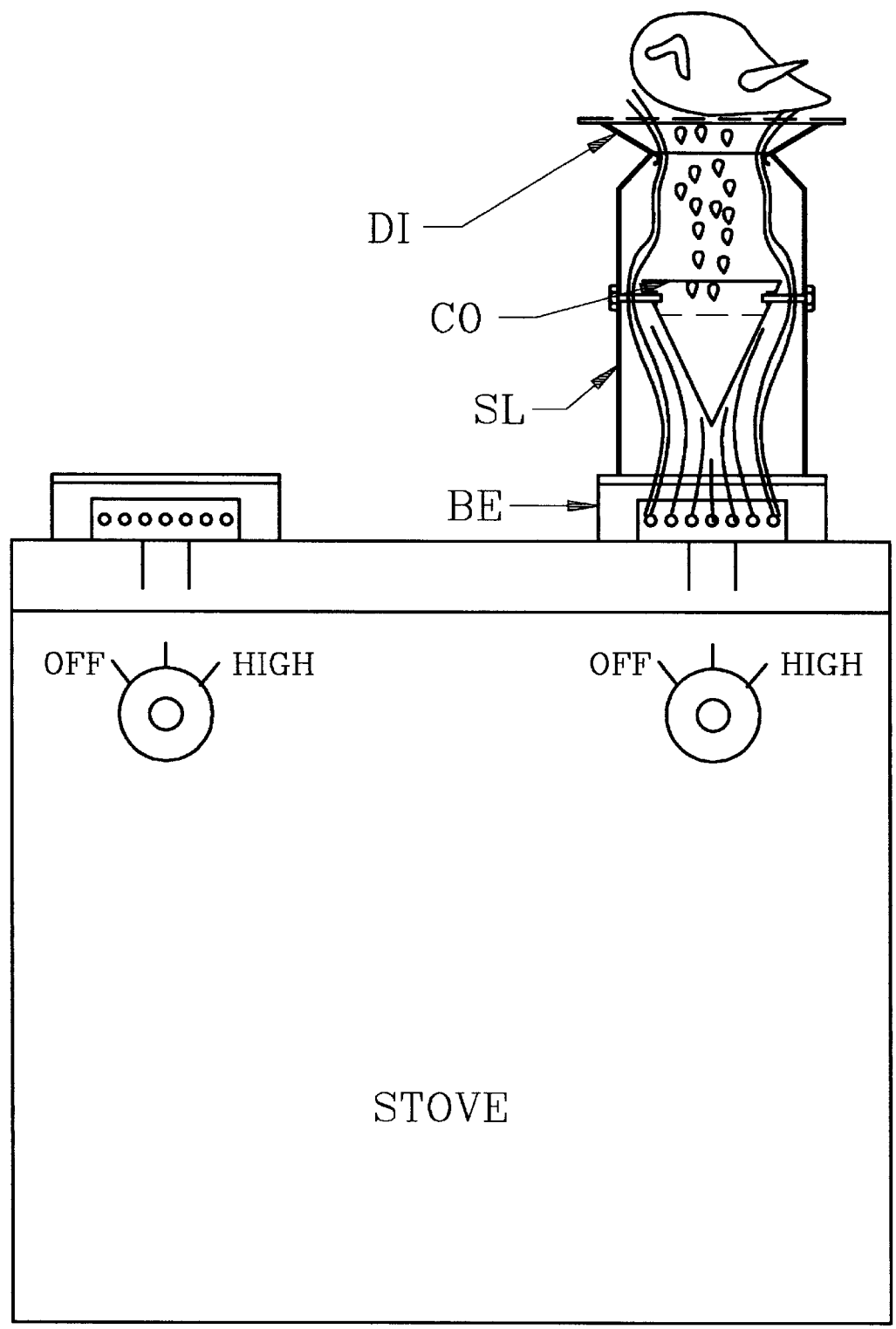

FIG. 2 will illustrate the indoor smokeless grill situated on a stove. Sleeve SL is situated surrounding the burner BE. The hot air cooks the meat. The lower diameter of dish DI is smaller than the upper diameter of container CO, therefore the liquid fat from said dish will drop into the container CO.

FIG. 3 will illustrate the indoor smokeless grill, like FIG. 1. It should be noted that dish DI can be designed to contain water as well, so that it traps some of the fat up to the top before it reaches said lower container. It should be noted that the water in the container can reach the boiling point, creating steam which will help the cooking process.

FIG. 4 will illustrate the indoor smokeless grill whereby the container CO is situated on sleeve SL by screw SC which sits in nut NU which is bolted to sleeve SL by bolts BO. The user can turn the container to the left or to the right, and by doing so will change the height of container CO up or down relative to the fire or heat source. Adjusting the distance between the container and the fire affects the amount of steam that is emitted from said container. In addition, positioning the upper end of said container nearer to the upper end of sleeve SL restricts the heat from getting to the food, thereby slowing the cooking process.

FIG. 5 will illustrate another embodiment of the invention whereby the movement of said container will be governed automatically. Container CO hangs on a bimetal (containing two pieces, each made of different metal, e.g., aluminum and steel) strip BIM that is connected to the top of sleeve SL. Said bimetal strip lies flat when cold, but the moment that very hot air reaches it, said bimetal strip reacts by bending upward, pulling the water container CO upward and restricting the flow of the hot burning air through passageway PA to the food. This causes a buildup of hot burning air that creates more steam. Excess hot burning air escapes from the windows WI, and the additional steam reduces the temperature of the hot air. When the temperature of the hot air is reduced the bimetal strip will bend back and lower the container CO, again opening the passageway PA and permitting the burning air to rise. Bimetal strip BIM can be designed by known means to act as an adjustable thermostat so the user can set the desired cooking temperature. As an example of such an adjustment, into cup CP, a spring housing, is screwed bolt BOL. Said bolt will bias on spring SP which is attached to bimetal strip BIM, and if spring SP puts more pressure on said bimetal strip BIM, the cooking temperature will rise. An electric stove can do the work as well. The embodiments that are illustrated are only examples and do not limit the scope of the invention. It can be modified and still be within the scope of the invention.

The water container can be mounted so that it can be lifted or lowered regarding its distance from the grill or the fire.

The sleeve can be composed of two pieces, with the upper piece sliding into the lower one, allowing increased flexibility in keeping it distanced from the fire.

This smokeless grill can of course also be used outdoors. Also, the water for container CO can be fed from an outside water pipe.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. An indoor and outdoor smokeless grill, comprising:
   a hollow housing having a first end and a second end, at the first end the hollow housing has at least one inlet for letting in hot burning air from a heat source, at the second end, the hollow housing has at least one outlet which directs the hot burning air from the inlet to an external grill situated on top of the outlet, the hollow housing further has lips extending from the housing into the hollow portion of the housing, the outlet is a continuation to the inlet such that a first portion of the housing between and including the second end and the lips is maintained at temperatures in which liquids and particles dropping from grilled food on such first portion of the housing cannot burn and smoke; and
   a first liquid container located in said hollow housing under the lips, such that the position and location of the first liquid container permits optimum hot burning air flow from the inlet to the outlet, allowing the hot burning air to reach the grill, the container receives liquids and particles melting from the grilled food, and the container further receiving liquids and particles traveling down the first portion of the housing defined between the second end to the lips, preventing such liquids and particles from reaching the heat source and the second portion of the housing.

2. An indoor and outdoor smokeless grill as in claim 1, further comprising a second container situated above the lips, under the grill, the second container having a passage therethrough for allowing the hot burning air to pass through the second container to the food and for letting said liquids and particles falling and melting from the food to drop to the first container.

3. An indoor and outdoor smokeless grill as in claim 2, wherein the second container is a second liquid container filled with a liquid, which is heated up by the heat source to produce moisture under the grill.

4. An indoor and outdoor smokeless grill as in claim 1, wherein the first container has a cone shape.

5. An indoor and outdoor smokeless grill as in claim 1, wherein the first container is vertically adjustable, allowing the first container to be adjusted up and down relative to the heat source and the grill.

6. An indoor and outdoor smokeless grill as in claim 5, wherein the first container is automatically vertically adjustable by means responsive to temperature change.

7. An indoor and outdoor smokeless grill as claimed in claim 1, having means that restrict and control the flow of said hot air to the food.

8. An indoor and outdoor smokeless grill as in claim 7, wherein the means responsive to temperature change is a bimetal which pushes the first container away from the heat source when the temperature of the hot burning air reaches a first predetermined temperature and releases the first container to drop toward the heat source when the temperature drops below the first predetermined temperature.

9. An indoor and outdoor smokeless grill as in claim 1, wherein the first container is a first liquid container filled with a liquid, which is heated up by the heat source, the liquid in the first liquid container produces moisture under the grill.

10. An indoor and outdoor smokeless grill as in claim 1, wherein the outlet is relatively broader than the inlet.

11. An indoor and outdoor smokeless grill, comprising:
    a hollow housing having a first end having at least one inlet for letting in hot burning air from a heat source, a second end having at least one outlet, the hollow housing further having a neck portion between the first and second ends, the housing having a geometry such that the neck portion is narrower than the at least one inlet and the at least one outlet is broader than the neck portion, the relative sizes of the openings of the inlet, the neck portion and the outlet are such that the hot burning air entering from the at least one inlet is concentrated by the neck portion onto a central portion of the at least one outlet, maintaining an upper area of the housing between the second end and the neck portion at temperatures which do not burn liquids and particles;
    an external grill supported by the at least one outlet; and
    a liquid container disposed under the neck portion for capturing liquids and particles melting directly from the food and capturing liquids and particles traveling down from a lower area of the housing defined between the neck portion and the first end.

12. An indoor and outdoor smokeless grill as in claim 11, wherein relatively small lips extend from the neck portion down, the lips guiding liquids and particles traveling down from the second end towards the liquid container, wherein the geometry of the housing is such that between the second end and the lips the temperature of the housing is such that liquids and particles falling on the housing between the second end and the lips do not burn.

* * * * *